(12) United States Patent
Funk et al.

(10) Patent No.: US 8,528,981 B2
(45) Date of Patent: Sep. 10, 2013

(54) STRUCTURE FOR A VEHICLE SEAT

(75) Inventors: Stefan Funk, Leichlingen (DE); Martin Zynda, Burscheid (DE); Stefan Josten, Rommerskirchen (DE); Bernd Engels, Remscheid (DE); Andreas Hansen, Waldenbuch (DE)

(73) Assignee: Johnson Controls Technology Company, Holland, MI (US)

( * ) Notice: Subject to any disclaimer, the term of this patent is extended or adjusted under 35 U.S.C. 154(b) by 499 days.

(21) Appl. No.: 12/669,468

(22) PCT Filed: Jun. 20, 2008

(86) PCT No.: PCT/EP2008/004994
§ 371 (c)(1),
(2), (4) Date: Jul. 14, 2010

(87) PCT Pub. No.: WO2009/010149
PCT Pub. Date: Jan. 22, 2009

(65) Prior Publication Data
US 2010/0283309 A1 Nov. 11, 2010

(30) Foreign Application Priority Data

| Jul. 18, 2007 | (DE) | 10 2007 033 776 |
| Jul. 18, 2007 | (DE) | 10 2007 033 777 |
| Jul. 18, 2007 | (DE) | 10 2007 033 778 |
| Jul. 18, 2007 | (DE) | 10 2007 033 780 |
| Jul. 18, 2007 | (DE) | 10 2007 033 782 |
| Jul. 18, 2007 | (DE) | 10 2007 033 783 |
| Nov. 9, 2007 | (DE) | 10 2007 053 964 |

(51) Int. Cl.
*B60N 2/42* (2006.01)

(52) U.S. Cl.
USPC ............ 297/452.2; 297/216.1; 297/216.13; 297/452.18

(58) Field of Classification Search
USPC ............... 297/452.18, 452.2, 216.1, 216.13
See application file for complete search history.

(56) References Cited

U.S. PATENT DOCUMENTS

| 4,246,734 | A | * | 1/1981 | Fogle et al. | 52/309.16 |
| 5,013,089 | A | * | 5/1991 | Abu-Isa et al. | 297/452.2 X |
| 5,246,271 | A | * | 9/1993 | Boisset | 297/452.2 X |
| 5,362,132 | A | * | 11/1994 | Griswold et al. | 297/452.2 X |
| 5,501,509 | A | * | 3/1996 | Urrutia | 297/452.2 X |
| 5,575,533 | A | * | 11/1996 | Glance | 297/452.2 |

(Continued)

FOREIGN PATENT DOCUMENTS

| DE | 2303289 | 8/1974 |
| DE | 3636113 | 4/1987 |

(Continued)

OTHER PUBLICATIONS

German Examination Report dated Sep. 13, 2011.

(Continued)

*Primary Examiner* — Rodney B White
(74) *Attorney, Agent, or Firm* — Fletcher Yoder P.C.

(57) ABSTRACT

A vehicle seat includes a backrest and a seat part, at least one of which has a structural element forming a cavity. A filling is disposed in the cavity and configured to influence the stability and/or the deformation behavior of the backrest and/or the seat part. The filling comprises a foam support and a foam material that at least partially surrounds the foam support.

13 Claims, 7 Drawing Sheets

(56) References Cited

U.S. PATENT DOCUMENTS

| | | | | |
|---|---|---|---|---|
| 5,711,577 | A | * | 1/1998 | Whalen ................... 297/452.2 X |
| 5,716,100 | A | * | 2/1998 | Lang ....................... 297/452.2 X |
| 5,722,731 | A | * | 3/1998 | Chang ..................... 297/452.2 X |
| 5,971,490 | A | * | 10/1999 | Chang ..................... 297/452.2 X |
| 5,988,756 | A | * | 11/1999 | Aufrere et al. ........... 297/452.2 X |
| 6,059,369 | A | * | 5/2000 | Bateson et al. ........... 297/452.18 |
| 6,062,643 | A | * | 5/2000 | Schroten et al. ...... 297/216.13 X |
| 6,419,305 | B1 | | 7/2002 | Larsen |
| 6,423,388 | B1 | * | 7/2002 | Bateson et al. ........ 297/452.2 X |
| 6,679,558 | B2 | * | 1/2004 | Adams et al. ........... 297/452.2 X |
| 6,802,124 | B2 | * | 10/2004 | Kinzer et al. ......... 297/452.18 X |
| 7,137,670 | B2 | * | 11/2006 | Gupta et al. ......... 297/452.18 X |
| 7,234,763 | B2 | | 6/2007 | Gupta et al. |
| 7,717,519 | B2 | * | 5/2010 | Kismarton et al. ...... 297/452.18 |
| 7,815,160 | B2 | * | 10/2010 | Stenard ...................... 249/114.1 |
| 8,033,600 | B2 | * | 10/2011 | Reynolds et al. .......... 297/216.1 |
| 8,128,174 | B2 | * | 3/2012 | Brunner et al. ......... 297/452.18 |
| 2004/0155513 | A1 | * | 8/2004 | Gupta et al. ............. 297/452.65 |
| 2005/0168041 | A1 | * | 8/2005 | Glance et al. ......... 297/452.2 X |
| 2010/0213750 | A1 | * | 8/2010 | Bogard ................... 297/452.18 |
| 2011/0169317 | A1 | * | 7/2011 | Fujita et al. ................ 297/452.2 |

FOREIGN PATENT DOCUMENTS

| | | |
|---|---|---|
| DE | 3714588 | 11/1988 |
| DE | 4028895 | 2/1992 |
| DE | 42 08 150 A1 | 9/1993 |
| DE | 19727907 | 5/1998 |
| DE | 298 12 841 U1 | 11/1998 |
| DE | 19746164 | 4/1999 |
| DE | 19817279 | 10/1999 |
| DE | 10214476 | 3/2003 |
| DE | 101 58 627 A1 | 6/2003 |
| DE | 69720438 | 2/2004 |
| DE | 102 40 042 A1 | 3/2004 |
| DE | 102 50 218 A1 | 5/2004 |
| DE | 103 21 289 A1 | 12/2004 |
| DE | 101 42 981 B4 | 4/2005 |
| DE | 102004043860 | 3/2006 |
| DE | 102006014538 | 5/2007 |
| EP | 0 893 332 A1 | 1/1999 |
| EP | 0893332 | 1/1999 |
| EP | 1591224 | 11/2005 |
| GB | 2 298 123 A | 8/1996 |
| JP | 10 69309 A | 3/1989 |
| JP | 1999-165355 | 6/1999 |
| WO | 01 89875 A1 | 11/2001 |
| WO | 2005 002950 A2 | 1/2005 |

OTHER PUBLICATIONS

International Preliminary Examination Report (Jun. 20, 2008); Written Opinion (Apr. 2007).
German Examination Report (Apr. 21, 2008).
Japanese Office Action dated Nov. 20, 2012.

* cited by examiner

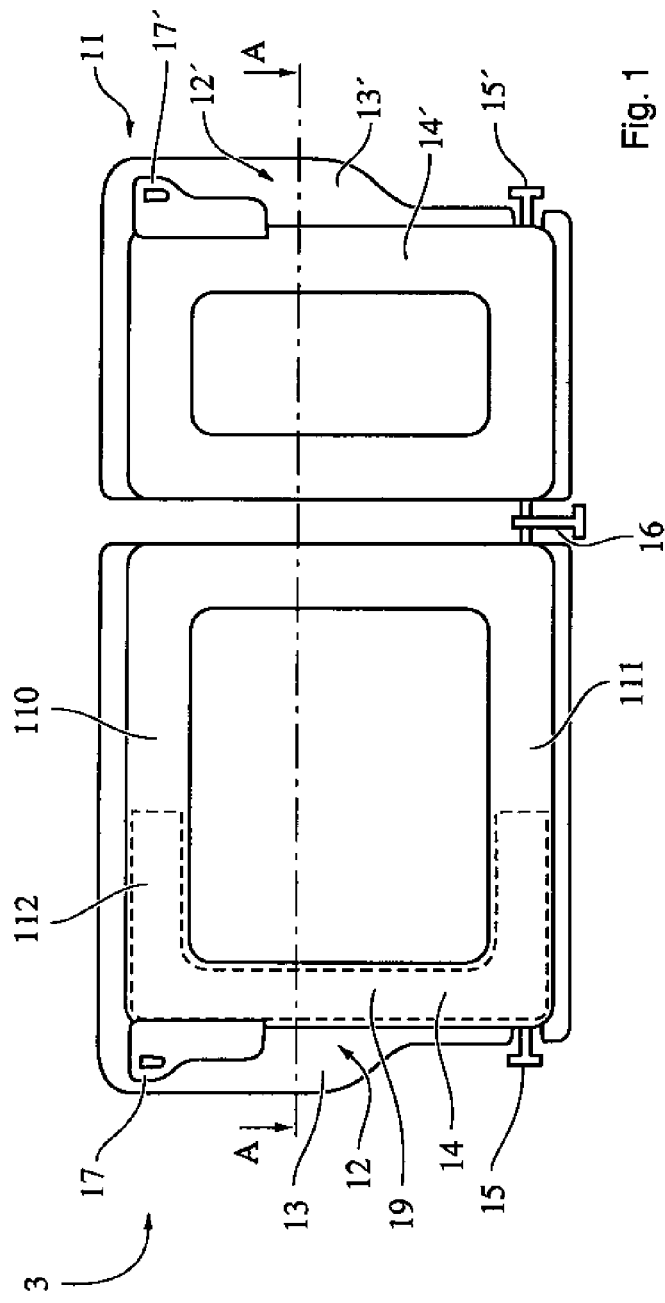
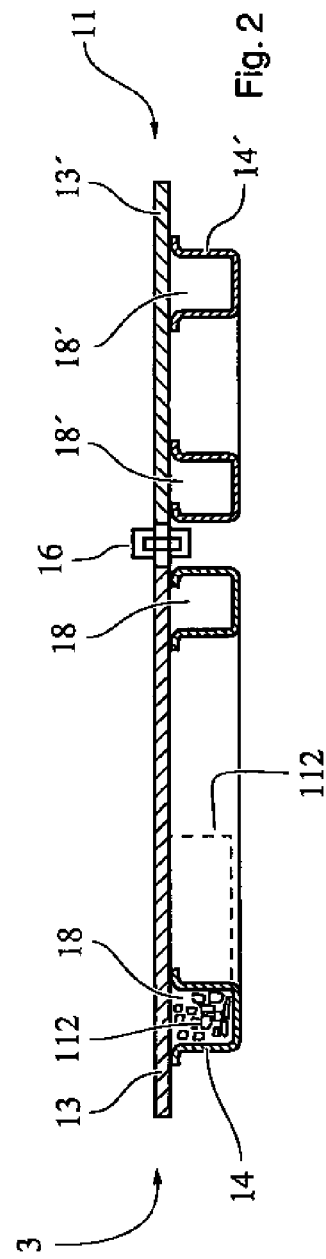

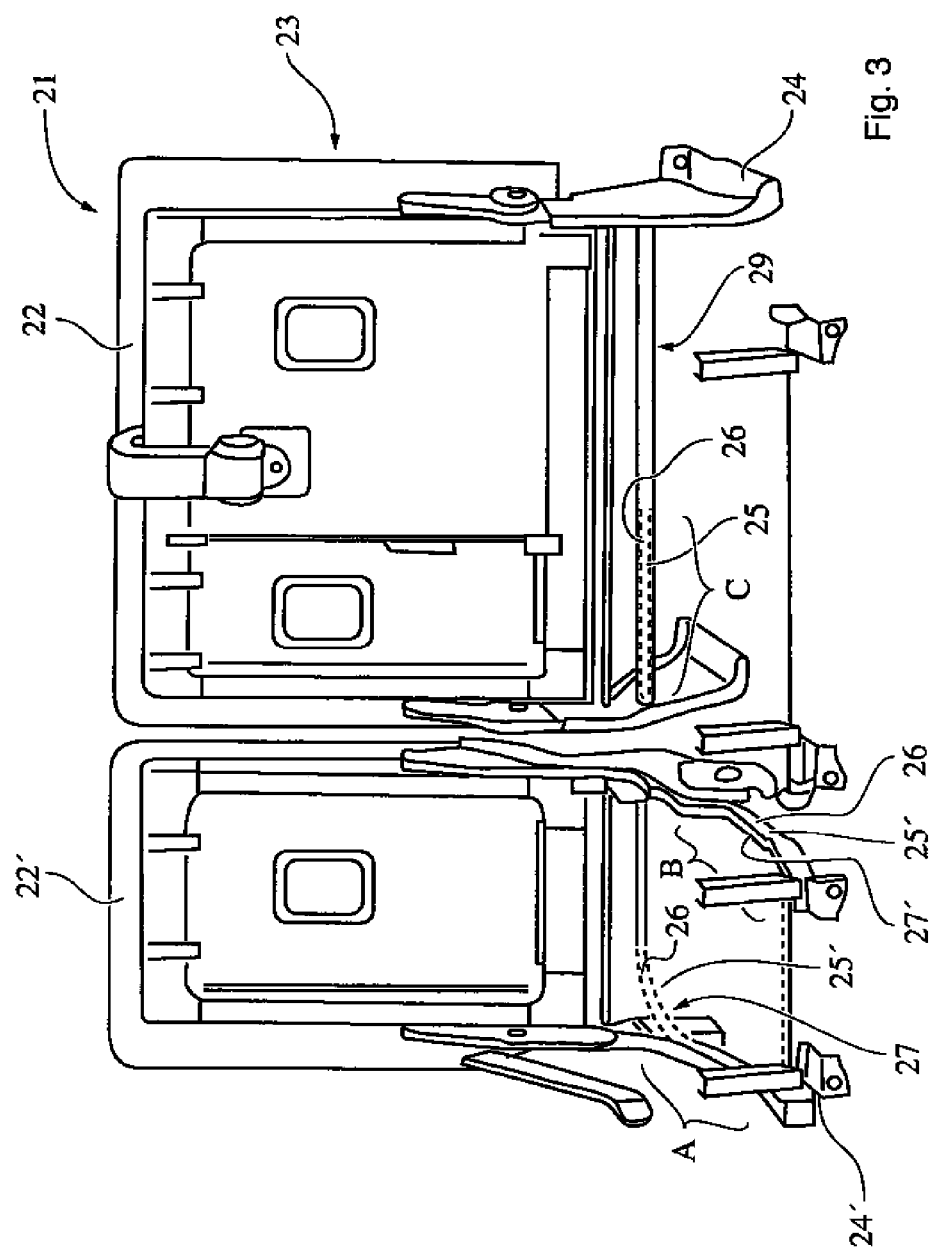

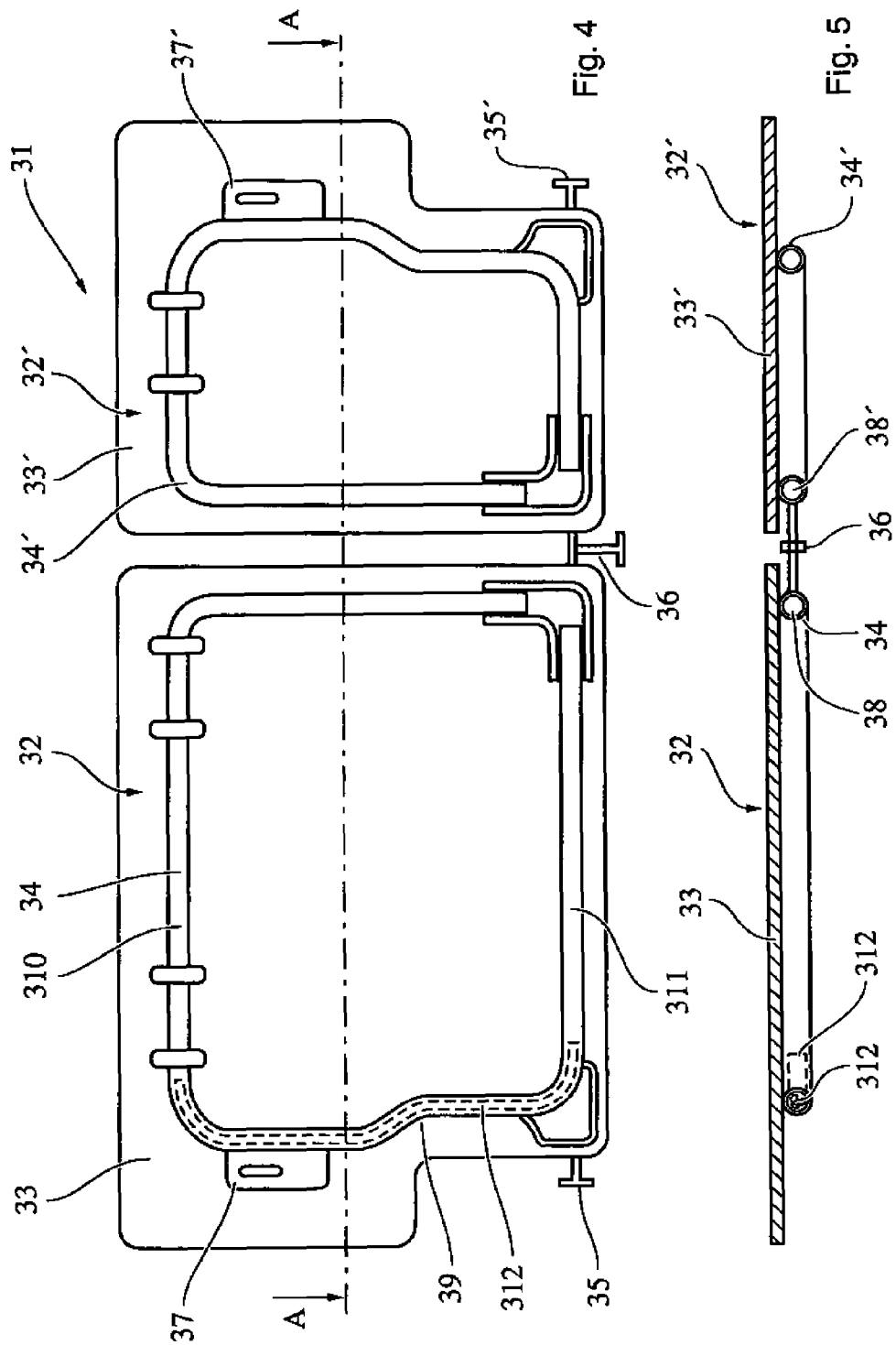

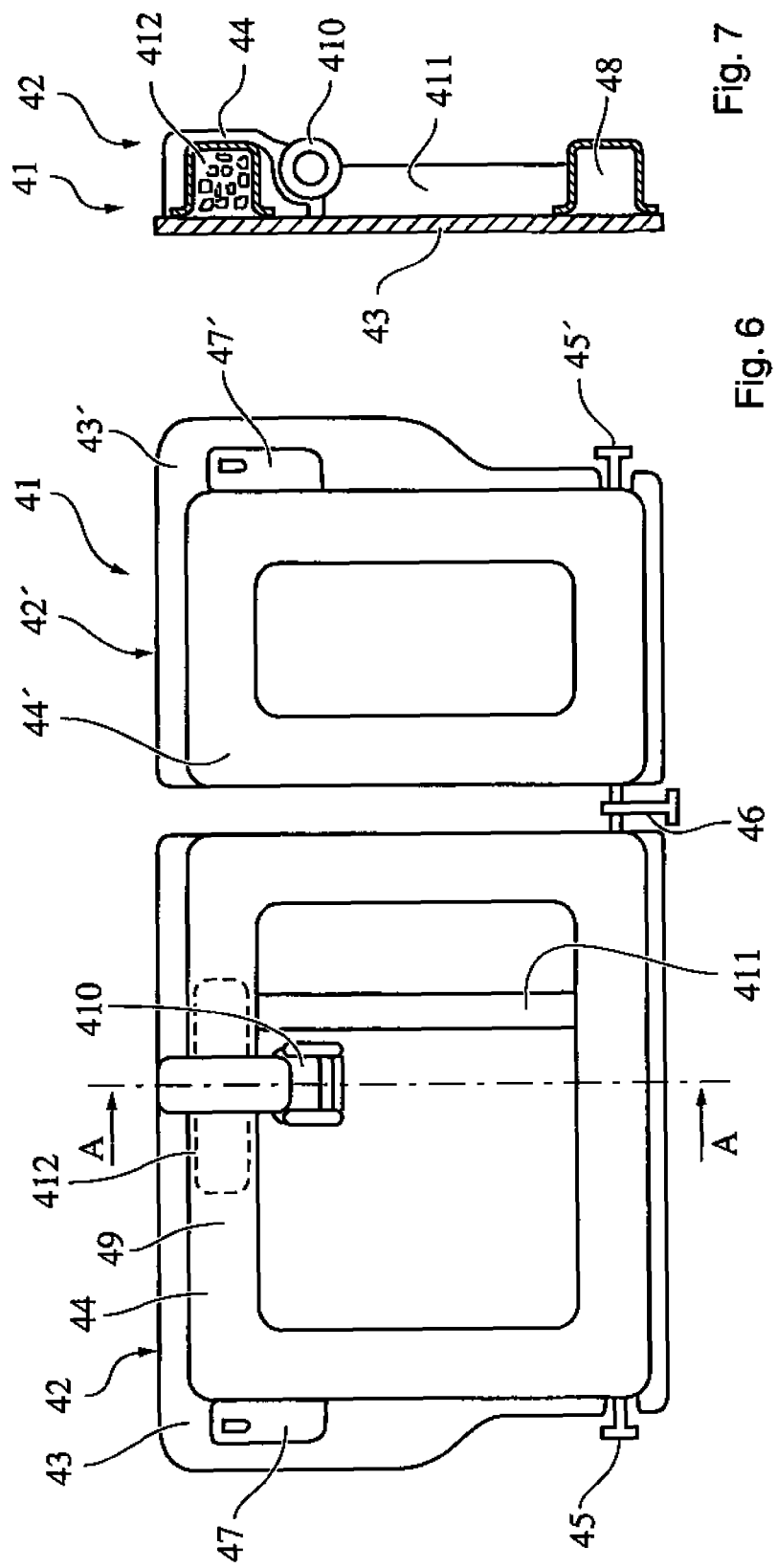

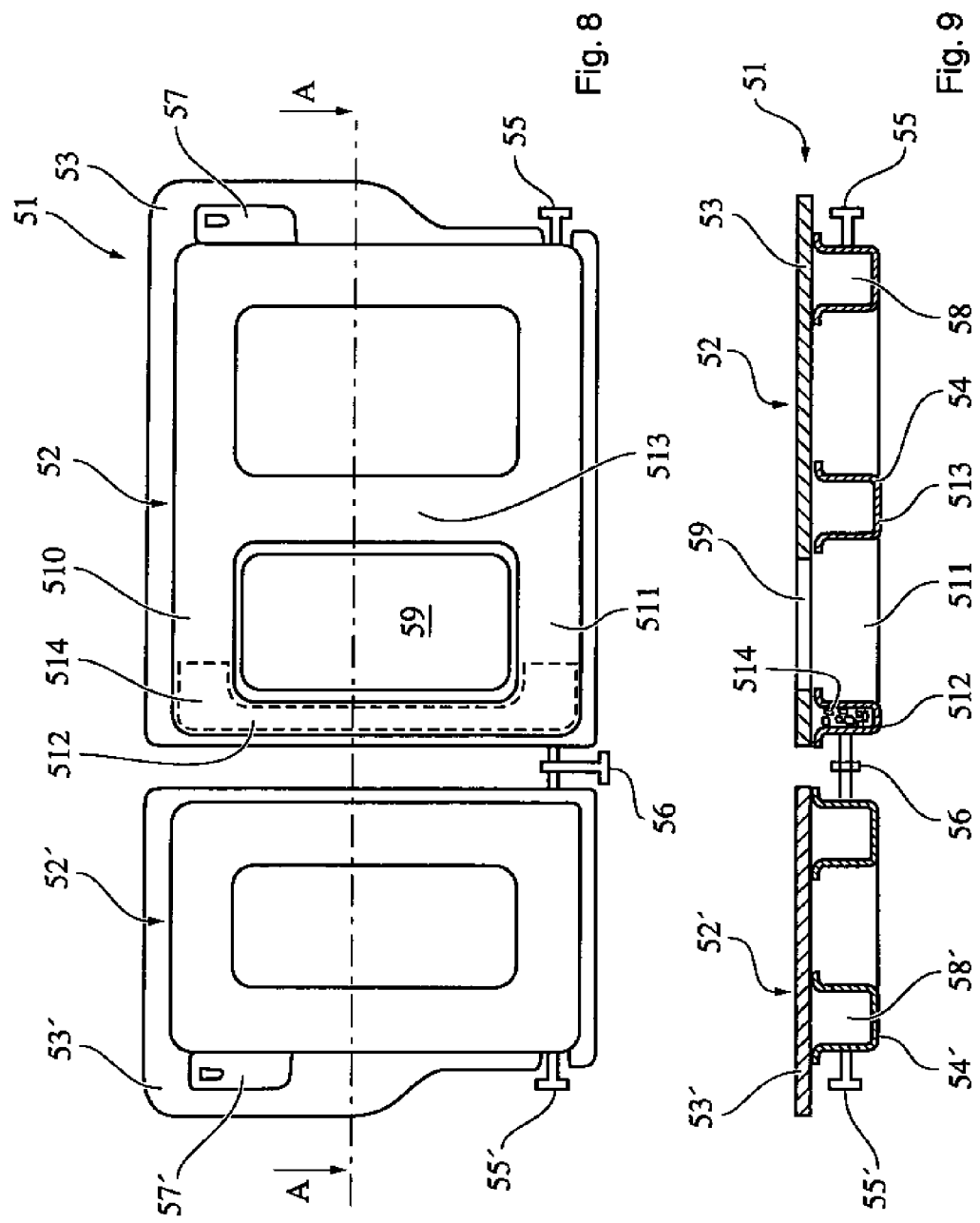

STRUCTURE FOR A VEHICLE SEAT

CROSS REFERENCE TO RELATED APPLICATIONS

This application claims priority from and the benefit of PCT Application No. PCT/EP2008/004994, filed on Jun. 20, 2008; German Patent No. DE 10 2007 033 776.2, filed on Jul. 18, 2007; German Patent DE 10 2007 033 780.0, filed on Jul. 18, 2007; German Patent No. DE 10 2007 777.0, filed on Jul. 18, 2007; and German Patent No. DE 10 2007 033 783.5, filed on Jul. 18, 2007; all entitled "Structure for a Vehicle Seat", which are herein incorporated by reference.

BACKGROUND

The invention relates to a structure for a vehicle seat, which structure comprises rigid structure components which form cavities and comprises a foam structure which at least partially fills the cavities.

Such vehicle seats are generally known. For example, the German laid-open specification DE 102 14 476 A1 and the German laid-open specification DE 103 21 289 A1 respectively disclose a frame composed of hollow profiles and a backrest of a vehicle seat, with a foam being arranged in each case in cavities of structural elements. Furthermore, the German laid-open specification DE 10 2004 043 860 A1 and the German laid-open specification DE 197 46 164 A1 respectively disclose a backrest for a seat and a material combination having a profile which is hollow at least in sections, with a foam being arranged in cavities of structural elements. Furthermore, the German laid-open specification DE 42 08 150 A1 and the German laid-open specification DE 197 27 907 A1 respectively disclose a backrest for a vehicle seat and a method for filling cavities in workpieces or semi-finished parts. Furthermore, the German patent document DE 40 28 895 C1 and the European patent application EP 1 591 224 A1 respectively disclose a foam body for partitioning body cavities and a device and method for noise damping in cavities of vehicles. Furthermore, the patent DE 10 2006 014 538 B3 discloses the arrangement of a cable in the interior of a tube on a motor vehicle seat, and an elastic body for a line bushing is known from document DE 198 17279 A1. Furthermore, document DE 36 36 113 A1 discloses a method for forming a foamed mass in a cavity, DE patent 23 03 289 discloses a vehicle seat having a shell which supports a seat back pad, and document DE 37 14 588 A1 discloses a safety seat back beam composed of plastic.

It is disadvantageous in the known vehicle seats that, in part, the cavity is always completely filled or else only a partial filling of the cavity is aimed merely at improving the acoustic properties.

SUMMARY

The object of the present invention is therefore the targeted formation or introduction of a filling in or into a cavity of a structural element of a vehicle seat in order to improve the mechanical properties of the vehicle seat.

The object is achieved by means of a vehicle seat having a backrest and having a seat part, with the backrest or the seat part having at least one structural element which has a cavity, with at least one part of the cavity having provided in it a filling which is introduced to influence the stability and/or the deformation behavior of the backrest and/or of the seat part, with the filling having a foam support and a foam material, with the foam material at least partially surrounding the foam support, and with the foam material preferably completely surrounding the foam support. In this way, an improvement in the mechanical properties of the vehicle seat can be obtained in a simple manner in that the filling is arranged and formed such that, during the formation of the foam from the foam material (that is to say during the expansion of the foam material), firstly a good connection, in particular adhesive connection, with the inner surfaces or the inner wall of the structural element is obtained, and such that, secondly, easy insertion of the filling into the cavity is ensured, which leads to ease of assembly of the vehicle seat according to the invention.

It is particularly preferable according to the invention for the foam material to be provided so as to expand in an electrocoating kiln. In this way, the foam reinforcement of the vehicle seat can be integrated quickly and in a simple manner in terms of assembly by means of one working step which is carried out in any case.

It is particularly preferable if
- the structural element forms, as a cavity, a hollow chamber which runs around in the manner of a frame in the backrest or in the seat part, with the hollow chamber having the foam material in its region facing toward a vehicle side region, with the foam material running in particular in a substantially C-shaped manner along the hollow chamber, and/or if
- the structural element is formed as a tube in the backrest or in the seat part and forms a hollow chamber which runs around in the manner of a frame, with the hollow chamber having the foam material in its region facing toward a vehicle side region, with the foam material running in particular in a substantially C-shaped manner along the hollow chamber, and/or if
- the structural element is reinforced by means of the foam material in the region of a belt rolling device, which is provided on the backrest, of an integral belt, in particular in the region of the upper transverse member of the backrest, and/or if
- the structural element is reinforced by means of the foam material in the region around a through-loading opening of the backrest, and/or if
- the vehicle seat is designed as a belt-integrated seat, with the structural element being reinforced by means of the foam material in the region of a side beam, which has a belt deflecting point or a belt rolling device, of the backrest.

In this way, it is possible according to the invention to obtain a targeted reinforcement at highly loaded points of the vehicle seat or of the backrest and/or of the seat part. It is also preferable according to the invention for a combination of a foam reinforcement to take place at more than one of said points. It is hereby advantageously possible according to the invention for the weight and costs of a vehicle seat of said type to be reduced in that, for example, the wall thickness of a metal material to be used, for example steel plate, or else plastic material need not imperatively be designed or selected such that mechanically highly loaded parts or regions of the vehicle seat withstand the occurring loadings, but rather conversely the wall thickness of a material to be used may be reduced and a reinforcement in the form of the filling with, inter alia, the foam material is provided at such mechanically highly loaded parts or regions of the vehicle seat.

A further subject matter of the present invention relates to a vehicle seat having a backrest and a seat part, with the backrest or the seat part having at least one structural element which has a cavity, with at least one part of the cavity having provided in it a filling which is introduced to influence the stability and/or the deformation behavior of the backrest and/or of the seat part and which has a foam material, wherein either the structural element forms, as a cavity, a hollow chamber which runs around in the manner of a frame in the backrest or in the seat part, with the hollow chamber having the foam material in its region facing toward a vehicle side region, with the foam material running in particular in a substantially C-shaped manner along the hollow chamber, or wherein the structural element is formed as a tube in the backrest or in the seat part and forms a hollow chamber which runs around in the manner of a frame, with the hollow chamber having the foam material in its region facing toward a vehicle side region, with the foam material running in particular in a substantially C-shaped manner along the hollow chamber, or wherein the structural element is reinforced by means of the foam material in the region of a belt rolling device, which is provided on the backrest, of an integral belt, in particular in the region of the upper transverse member of the backrest, or wherein the structural element is reinforced by means of the foam material in the region around a through-loading opening of the backrest, or wherein the vehicle seat is designed as a belt-integrated seat, with the structural element being reinforced by means of the foam material in the region of a side beam, which has a belt deflecting point or a belt rolling device, of the backrest. In this way, according to the invention, there are advantageously also alternative possibilities for introducing the filling material into the cavity, for example the injection of plastic material for the formation of foam into the cavity.

Further subjects of the present invention relate to a method for producing a vehicle seat according to the invention, wherein the structural element which has the cavity is formed in a first step, wherein the still-unexpanded filling, which has the foam support and the foam material, is introduced into the cavity in a second step, and wherein electrocoating is carried out in a third step during which the foam material expands, and to a method for producing a vehicle seat according to the invention, wherein the still-unexpanded filling, which has the foam support and the foam material, is positioned and/or fastened relative to a part of the structural element in a first step, wherein the cavity is formed in a second step, and wherein electrocoating is carried out in a third step, during which the foam material expands.

DRAWINGS

The figures schematically illustrate embodiments of the invention by way of example.

FIGS. 1 and 2 show a first embodiment of a vehicle seat according to the invention, or of one of its parts.

FIG. 3 shows a second embodiment of a vehicle seat according to the invention, or of one of its parts.

FIGS. 4 and 5 show a third embodiment of a vehicle seat according to the invention, or of one of its parts.

FIGS. 6 and 7 show a fourth embodiment of a vehicle seat according to the invention, or of one of its parts.

FIGS. 8 and 9 show a fifth embodiment of a vehicle seat according to the invention, or of one of its parts.

DETAILED DESCRIPTION

Figure 12:
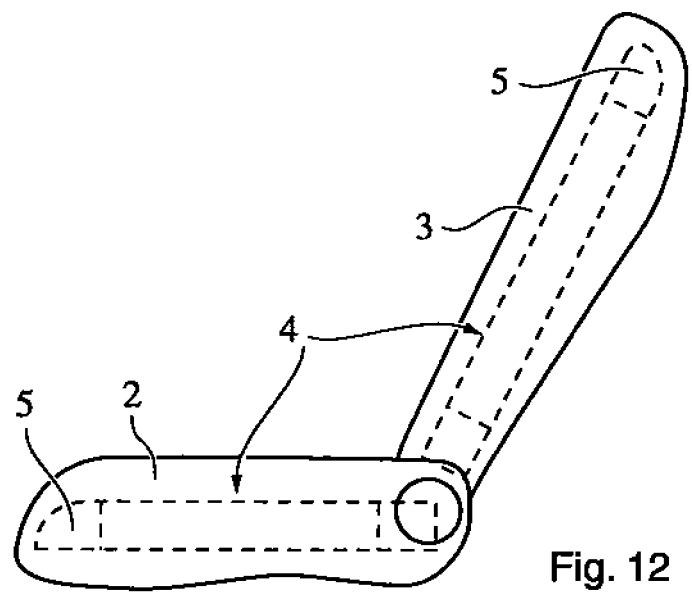
FIGS. 12 and 13 show schematic illustrations of a vehicle seat according to the invention, conforming with all of the embodiments.
Figure 13:
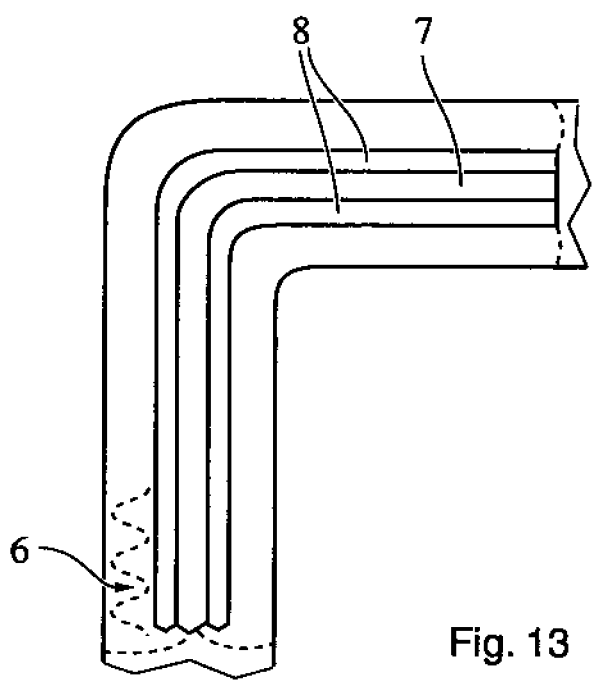

FIGS. 12 and 13 show a vehicle seat according to the invention having features shared by all the embodiments of the present invention. A vehicle seat of said type comprises a seat part 2 and a backrest 3. Both the seat part 2 and also the backrest 3 have in each case at least one structural element 4 which, below, is also referred to as a seat back segment, seat back structure, longitudinal beam, transverse beam, tube structure, side beam, pressed part or structure component. A cavity 5 is provided at least in partial regions in said structural element 4, which cavity 5 is also referred to below as a hollow chamber. The cavity 5 is for example in the form of a frame substantially following the outer shape or periphery of the backrest 3 or of the seat part 2, and is for example substantially round or oval or rounded (for example in the case of tube structures or tube-like structures) or else substantially angular, rectangular, triangular or angled (for example in the case of a U-shaped profile connected to a base plate) in cross section. According to the present invention, at least one partial region of the cavity 5, and preferably also only one partial region of the cavity 5, has arranged in it a filling 6 which comprises a foam material 8. The filling 6 or the foam material 8 is also referred to below as a foam structure. The filling 6 or the foam material 8 may duly be injected from the outside by injecting an easily deformable or foaming material (for example through an opening in the cavity 5), but it is preferable according to the present invention for the filling 6 to be introduced into the cavity 5 in the form of a still-unexpanded and substantially hard, or at any rate substantially non-adhesive, foam material 8 which is connected to the foam support 7, or else fastened to or positioned on a structure part which forms a cavity wall, with the cavity 5 then being formed by means of a connection to another structure part. In a subsequent step, the foam material 8 is then expanded, as a result of which the foam material 8 then at least partially or preferably completely surrounds the foam support 7. To illustrate this, FIG. 13 shows a detail of a cavity 5 formed in the structural element 4, with the filling 6, that is to say the foam support 7 and the foam material 8, being illustrated in the cavity 5 in the unexpanded state of the foam material 8 by means of solid lines, and with dashed lines or dots illustrating the limit of the foam material 8 in the foamed state. According to the invention, the expansion of the foam material 8 may take place in particular by means of a KTL bath treatment (not illustrated). This is to be understood to mean a treatment in an electrocoating kiln or a cathodic dip coating process in which the structural elements 4 of the vehicle seat are raised to a temperature of for example approximately 160° to approximately 180° over for example approximately 5 minutes to approximately 15 minutes, preferably approximately 10 minutes.

FIG. 1 shows the rear view of a split seat back structure of a first embodiment of a vehicle seat according to the invention, and FIG. 2 shows a section A-A through the seat back structure according to FIG. 1. The seat back structure 11 of the split backrest of a vehicle rear seat bench is composed of a first seat back segment 12 and a second seat back segment 12' which are split for example in the ratio 60:40. Each seat back segment comprises a base plate 13, 13' and a pressed part 14, 14' which is placed thereon and forms an encircling U-shaped profile. The base plates 13, 13' and the pressed parts 14, 14' are composed for example of metal, in particular sheet steel or aluminum, or of plastic, for example glass-fiber-reinforced plastic. Here, different materials may also be paired with one another. The seat back segments 12, 12' are mounted in the vehicle so as to be rotatable independently of one another by means of side mounts 15, 15' and a central mount 16. Rotary latch locks 17, 17' arranged laterally on the upper side region of the seat back structure 11 serve to lock the seat back segments 12, 12' to the vehicle body, in particular to the C pillar, in the upright use position. The base plates 13, 13' and pressed parts 14, 14' together form hollow chambers 18, 18' which each run around in the manner of a frame. It is provided according to the invention that the outer side beam 19 and the adjoining regions of the upper transverse beam 110 and of the lower transverse beam 111 at least of the relatively large seat back segment 12 are filled with a stiffening foam structure 112. In the rear view, the filled region in question of the hollow chamber 18 is of approximately C-shaped design (FIG. 1). The introduction of the foam structure 112 may take place by inserting a finished foam part, which is shaped correspondingly to the hollow chamber 18, before or during the welding of base plate 13 and pressed part 14. Alternatively, the foam structure 112 is first introduced after the welding process by means of an injection of a foamable mass into the hollow chamber 18. Particularly preferable, however, is the insertion of an in particular strand-like foam precursor, which has a three-dimensional shape, into the hollow chamber 18, which foam precursor is inserted into the hollow chamber 18 before, during or after the welding process and foams to form the foam structure 112 after an activation. The activation may take place for example as a result of a supply of heat during the painting of the seat back structure 11. For this purpose, use is preferably made of rigidly cross-linking foam systems, for example based on epoxide. The seat back structure 11 is hereby stiffened in the region which is highly loaded in the event of an accident, in such a way that further locking devices—such as for example a so-called shot bolt or a torque lock—can be dispensed with.

FIG. 3 shows a second embodiment of the vehicle seat according to the invention. The structure of the rear seat bench 21 comprises separately pivotable seat back segments 22, 22' (separated for example into the ratio 60:40) of the backrest 3 and brackets 24, 24' which are fastened to the vehicle floor and which have tubular structure components 25, 25'. The seat back segments 22, 22' are rotatably mounted on the respectively associated bracket 24, 24'. A stiffening foam structure 26 is introduced into the mechanically particularly highly loaded regions A, B and C of the tubular structure components 25, 25', that is to say in particular into the longitudinal beams 27, 27', which run in the direction of travel, of the bracket 24' of the relatively small seat back segment 22' (regions A, B) and into that part of the transverse beam 29 of the bracket 24 assigned to the relatively large seat back segment 22 which faces toward the central mount 28. The introduction of the foam structure 26 may for example take place by means of the injection of a foamable mass into the tubular structure components 25, 25'. Particularly preferable, however, is the insertion of an in particular strand-like foam precursor, which has a three-dimensional shape, into the interior of the tubular structure components 25, 25', which foam precursor foams to form the foam structure 26 after an activation. The activation may take place for example as a result of a supply of heat during the painting of the brackets 24, 24'. For this purpose, use is preferably made of rigidly cross-linking foam systems, for example based on epoxide. In the second embodiment, the (at least partially) foam-filled structure parts are of tubular design.

FIG. 4 shows the rear view of a split seat back structure according to a third embodiment of the vehicle seat according to the invention, and FIG. 5 shows a section A-A through the seat back structure according to FIG. 4. The seat back structure 31 of the split backrest of a vehicle rear seat bench is composed of a first seat back segment 32 and a second seat back segment 32', which are split for example in the ratio 60:40. Each seat back segment 32, 32' comprises a base plate 33, 33' and a tube structure 34, 34' which is placed thereon and which runs around substantially in the manner of a frame. The base plates 33, 33' and the tube structures 34, 34' are composed for example of metal, in particular of steel or aluminum. Here, different materials may also be paired with one another. The seat back segments 32, 32' are mounted in the vehicle so as to be rotatable independently of one another by means of side mounts 35, 35' and a central mount 36. Rotary latch locks 37, 37' arranged laterally on the upper side region of the seat back structure 31 serve to lock the seat back segments 32, 32' to the vehicle body, in particular to the C pillar, in the upright use position. The tube structures 34, 34' form substantially encircling hollow chambers 38, 38' which are each of frame-like design. It is provided according to the invention that the outer side beam 39 and if appropriate also the adjoining regions of the upper transverse beam 310 and of the lower transverse beam 311 at least of the relatively large seat back segment 32 are filled with a stiffening foam structure 312. In the rear view, the filled region in question of the hollow chamber 38 is rudimentarily of C-shaped design (FIG. 4). The foam structure 312 may for example be introduced by means of the injection of a foamable mass into the hollow chamber 38. Particularly preferable, however, is the insertion of an in particular strand-like foam precursor, which has a three-dimensional shape, into the hollow chamber 38, which foam precursor foams to form the foam structure 312 after an activation. The activation may take place for example as a result of a supply of heat during the painting of the seat back structure 31. For this purpose, use is preferably made of rigidly cross-linking foam systems, for example based on epoxide. The seat back structure 31 is hereby stiffened in the region which is highly loaded in the event of an accident, such that further locking devices can be dispensed with.

FIG. 6 shows the rear view of a split seat back structure of a fourth embodiment of the vehicle seat, and FIG. 7 shows a section A-A through the seat back structure according to FIG. 6. The seat back structure 41 of the split backrest of a vehicle rear seat bench is composed of a first seat back segment 42 and a second seat back segment 42' which are split for example in the ratio 60:40. Each seat back segment 42, 42' comprises a base plate 43, 43' and a pressed part 44, 44' which is placed thereon and forms an encircling U-shaped profile. The base plates 43, 43' and the pressed parts 44, 44' are composed for example of metal, in particular sheet steel or aluminum, or of plastic, for example of glass-fiber-reinforced plastic. Here, different materials may also be paired with one another. The seat back segments 42, 42' are mounted in the vehicle so as to be rotatable independently of one another by means of side mounts 45, 45' and a central mount 46. Rotary latch locks 47, 47' arranged laterally on the upper side region of the seat back structure 1 serve to lock the seat back segments 42, 42' to the vehicle body, in particular to the C pillar, in the upright use position. The base plates 43, 43' and pressed parts 44, 44' together form hollow chambers 48 which each run around in the manner of a frame. A belt rolling device 410 of an integral belt is provided in the center of the upper transverse beam 9. For further stiffening, a vertical beam 411 which is set into the pressed part 44 furthermore runs offset relative to said integral belt in the direction of the central mount 46. It is provided according to the invention that the upper transverse beam 49 is filled with a stiffening foam structure 412 in the region of the belt rolling device 410. The introduction of the foam structure 412 may take place by introducing a finished foam part, which is shaped correspondingly to the hollow chamber 8, before or during the welding of the base plate 43 and pressed part 44. Alternatively, the foam structure 412 is first introduced after the welding process by means of the injection of a foamable mass into the hollow chamber 48. Particularly preferable, however, is the insertion of an in particular strand-like foam precursor, which has a three-dimensional shape, into the hollow chamber 48, which foam precursor is placed into the hollow chamber 48 before, during or after the welding process and foams to form the foam structure 412 after an activation. The activation may take place for example as a result of a supply of heat during the painting of the seat back structure 41. For this purpose, use is preferably made of rigidly cross-linking foam systems, for example based on epoxide. The seat back structure 41 is hereby firstly stiffened in the region which is highly loaded in the event of an accident, and secondly the properties of said seat back structure 41 in the event of a head impact are improved. In particular, the deceleration of the test ball during the head impact test is improved.

FIG. 8 shows the rear view of a split seat back structure of a fifth embodiment of the vehicle seat according to the invention, and FIG. 9 shows a section A-A through the seat back structure according to FIG. 8. The seat back structure 51 of the split backrest of a vehicle rear seat bench is composed of a first seat back segment 52 and a second seat back segment 52' which are split in the ratio 60:40. Each seat back segment 52, 52' comprises a base plate 53, 53' and a pressed part 54, 54' which is placed thereon and forms an encircling U-shaped profile. The base plates 53, 53' and the pressed parts 54, 54' are composed for example of metal, in particular sheet steel or aluminum, or of plastic, for example of glass-fiber-reinforced plastic. Here, different materials may also be paired with one another. The seat back segments 52, 52' are mounted in the vehicle so as to be rotatable independently of one another by means of side mounts 55, 55' and a central mount 56. Rotary latch locks 57, 57' arranged laterally on the upper side region of the seat back structure 51 serve to lock the seat back segments 52, 52' to the vehicle body, in particular to the C pillar, in the upright use position. The base plates 53, 53' and pressed parts 54, 54' together form hollow chambers 58, 58' which each run around in the manner of a frame. A through-loading opening 59 is also provided in the relatively large seat back segment 52, which through-loading opening 59 is surrounded by the upper transverse beam 510, the lower transverse beam 511, the central-mount-side vertical beam 512 and a central vertical beam 513 of the pressed part 54. Here, the central-mount-side vertical beam 512 is of particularly slim design in order to be able to arrange the through-loading opening 59 as centrally as possible in the rear seat bench and to be able to design said through-loading opening 59 to be as large as possible—for example such that said through-loading opening is larger than the transverse extent of a snowboard. It is provided according to the invention that at least the central-mount-side vertical beam 512, if appropriate also the adjoining regions of the upper transverse beam 510 and of the lower transverse beam 511, are filled with a stiffening foam structure 514. The introduction of the foam structure 514 may take place by inserting a finished foam part, which is shaped correspondingly to the hollow chamber 58, before or during the welding of the base plate 53 and pressed part 54. Alternatively, the foam structure 514 is first introduced into the hollow chamber 58 after the welding process by means of the injection of a foamable mass. Particularly preferable, however, is the insertion of an in particular strand-like foam precursor, which has a three-dimensional shape, into the hollow chamber 58, which foam precursor is placed into the hollow chamber 58 before, during or after the welding process and foams to form the foam structure 514 after an activation. The activation may take place for example as a result of a supply of heat during the painting of the seat back structure 51. For this purpose, use is preferably made of rigidly cross-linking foam systems, for example based on epoxide. The seat back structure 51 is hereby considerably stiffened in the region 530 which is highly loaded in the event of an accident.

Figures 10, 11:
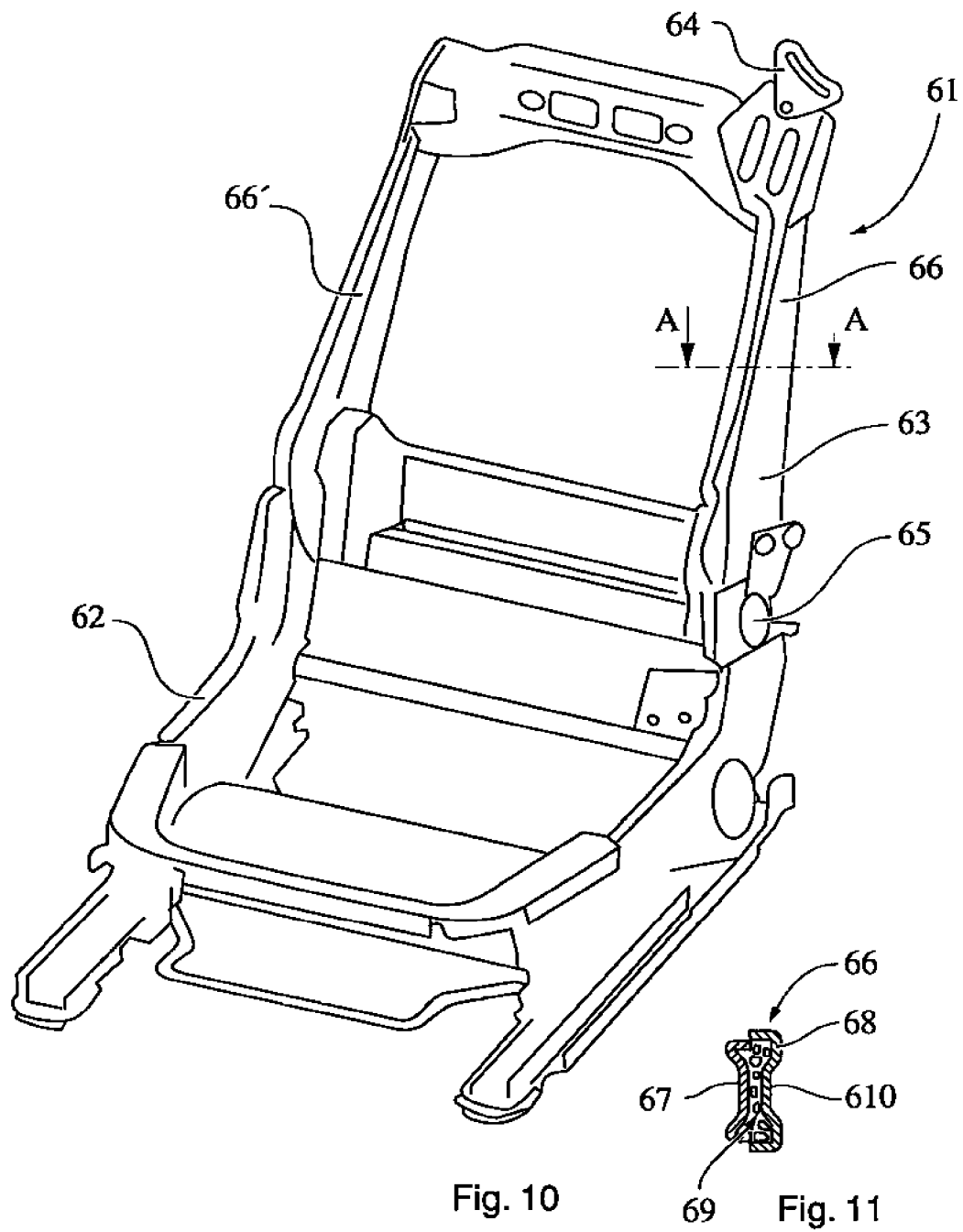
FIGS. 10 and 11 show a sixth embodiment of a vehicle seat according to the invention, or of one of its parts.

FIG. 10 shows the perspective view of a vehicle seat according to the invention as per a sixth embodiment. FIG. 11 shows a section A-A through the vehicle seat according to FIG. 10. The vehicle seat 61 shown in FIG. 10 has a seat part 62 and a backrest 63 and is designed as a belt-integrated seat in which a belt deflecting point 64 or the belt rolling device is fastened to the upper edge of the backrest 63. The backrest 63 must therefore dissipate the belt forces into the vehicle floor via the seat back tilt adjuster 65 and the seat part 62. The side beams 66, 66' of the backrest 63 are formed as U-shaped or hollow chamber profiles. In the exemplary embodiment, the side beams 66, 66', as shown in FIG. 11, are composed of two U-shaped pressed sheet-metal parts 67, 68 which are welded to one another at their limb ends in order to form a hollow chamber 69. At least that side beam 66 which is assigned to the belt deflecting point is provided, in the interior of the hollow chamber 67 over significant regions of its longitudinal extent, with a foam structure 610 which increases the bending stiffness and/or torsional stiffness of the side beam 66. The sheet-metal parts 67, 68 may therefore be formed with a relatively small sheet-metal thickness. The introduction of the foam structure 610 may take place by inserting a finished foam part, which is shaped correspondingly to the hollow chamber 69, before or during the welding of the sheet-metal parts 67, 68. Alternatively, the foam structure 610 is first introduced into the hollow chamber 69 after the welding process by means of the injection of a foamable mass into the hollow chamber 69. Particularly preferable, however, is the insertion of an in particular strand-like or sheet-like foam precursor, which has a three-dimensional shape, into the hollow chamber 69, which foam precursor is placed into the hollow chamber 69 before, during or after the welding process and foams to form the foam structure 610 after an activation. During the foaming of a U-shaped profile, the foaming direction of the foamable mass or of the foam precursor is predefined by suitable sealing means and/or the shape of the foam precursor. The activation may take place for example as a result of a supply of heat during the painting of the seat back structure 61. For this purpose, use is preferably made of rigidly cross-linking foam systems, for example based on epoxide.

It is also preferably provided according to the invention that measures specified in one of the embodiments may also be used in one or more of the other embodiments. It is thus possible according to the invention in particular for a tubular structure part to be provided both in the backrest of the vehicle seat and also in the seat part of the vehicle seat (combination of the second embodiment with the third embodiment). It is also possible for the fourth and/or the fifth embodiment to be combined with one or more of the first, second or third embodiments.

The invention claimed is:

1. A vehicle seat comprising a backrest and a seat part, the backrest or the seat part having at least one structural element which has a cavity, at least one part of the cavity comprising a filling configured to influence the stability and/or the deformation behavior of the backrest and/or of the seat part, the filling comprising a foam support and a foam material at least partially surrounding the foam support, wherein the cavity of the structural element comprises a hollow chamber which runs around in the manner of a frame in the backrest or in the seat part, the hollow chamber having the foam material in a region facing toward a vehicle side region, and the foam material runs in a substantially C-shaped manner along the hollow chamber.

2. The vehicle seat as claimed in claim 1, wherein the foam material completely surrounds the foam support.

3. The vehicle seat as claimed in claim 1, wherein the foam material is configured to expand in an electrocoating kiln.

4. The vehicle seat as claimed in claim 1, wherein the structural element is formed as a tube in the backrest or in the seat part.

5. The vehicle seat as claimed in claim 1, wherein the structural element is reinforced by the foam material in a region of a belt rolling device of an integral belt, which is provided on the backrest.

6. The vehicle seat as claimed in claim 5, wherein the structural element is reinforced by the foam material in a region of an upper transverse member of the backrest.

7. The vehicle seat as claimed in claim 1, wherein the structural element is reinforced by the foam material in a region around a through-loading opening of the backrest.

8. The vehicle seat as claimed in claim 1, wherein the vehicle seat comprises a belt-integrated seat, the structural element being reinforced by means of the foam material in a region of a side beam of the backrest, which has a belt deflecting point or a belt rolling device.

9. A vehicle seat comprising a backrest and a seat part, the backrest or the seat part having at least one structural element which has a cavity, at least one part of the cavity comprising a filling comprising a foam support and a foam material at least partially surrounding the foam support, and configured to influence the stability and/or the deformation behavior of the backrest and/or of the seat part and which has a foam material, wherein the structural element forms a hollow chamber which runs around in the manner of a frame in the backrest or in the seat part, the hollow chamber having the foam material in a region facing toward a vehicle side region, the foam material running in particular in a substantially C-shaped manner along the hollow chamber;

wherein the structural element is reinforced by the foam material in a region of a belt rolling device of an integral belt provided on the backrest, or the structural element is reinforced by the foam material in a region around a through-loading opening of the backrest, or the vehicle seat comprises a belt-integrated seat, the structural element being reinforced by the foam material in a region of a side beam of the backrest, which has a belt deflecting point or a belt rolling device.

10. A method for producing a vehicle seat as claimed in claim 1, comprising forming the structural element which has the cavity, introducing into the cavity a still-unexpanded filling, and expanding the filling to form the foam support and the foam material.

11. The method of claim 10, wherein the filling is expanded in an electrocoating operation.

12. A method for producing a vehicle seat as claimed in claim 1, comprising positioning and/or fastening a still-unexpanded filling relative to a part of the structural element, the filling comprising the foam support and the foam material, forming the cavity, and expanding the filling.

13. The method of claim 12, wherein the filling is expanded in an electrocoating operation.

* * * * *